_United States Patent Office_

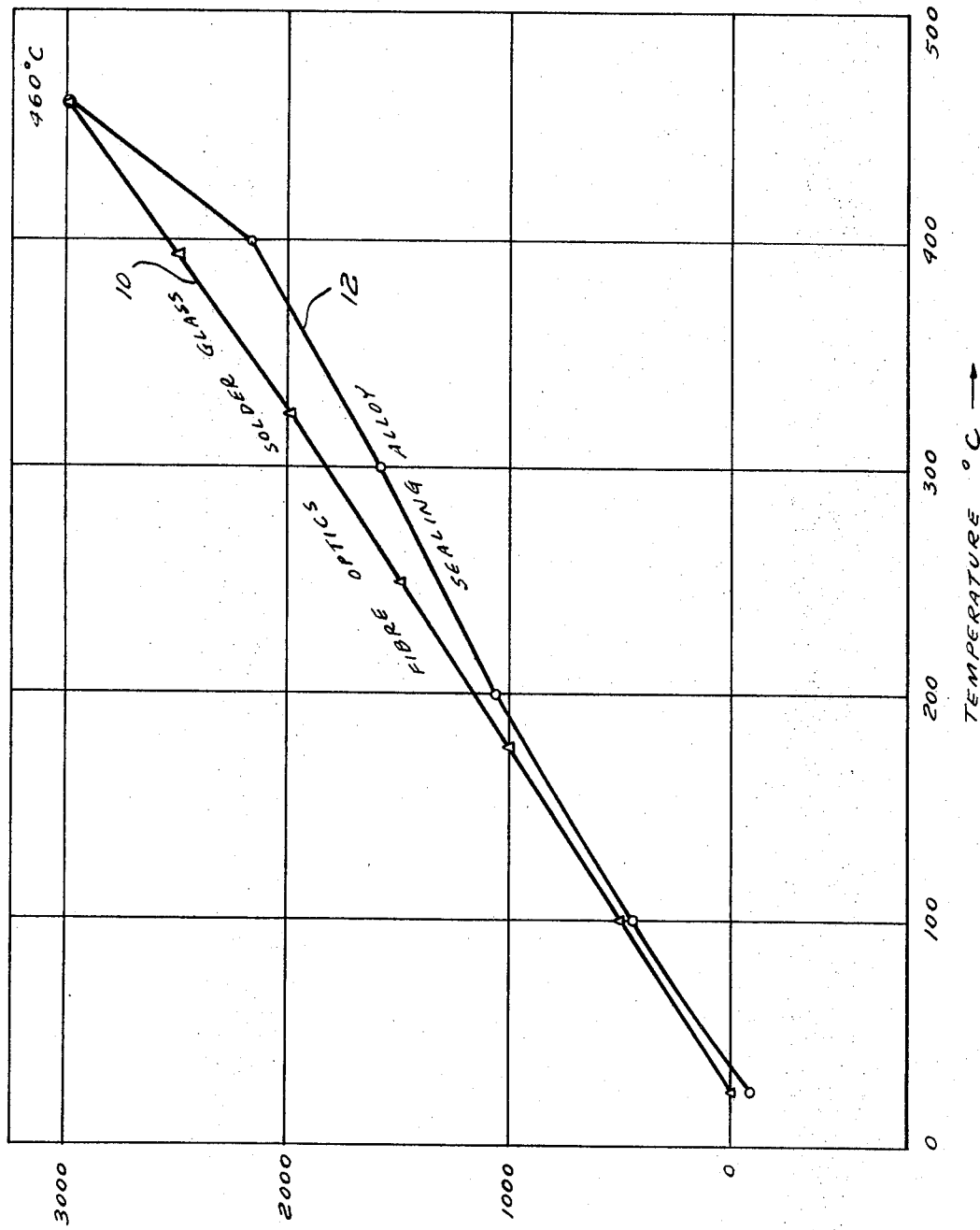

3,516,824
Patented June 23, 1970

3,516,824
FERROUS ALLOY CONTAINING NICKEL COBALT AND CHROMIUM
Arnold J. Gottlieb, Colonia, and George A. Majesko, Glen Ridge, N.J., assignors to Wilbur B. Driver Company, a corporation of Delaware
Filed Apr. 30, 1968, Ser. No. 725,279
Int. Cl. C22c 39/08
U.S. Cl. 75—128        5 Claims

ABSTRACT OF THE DISCLOSURE

An alloy used in forming glass to metal seals and the like and containing, as major constituents, nickel, cobalt, chromium and iron.

SUMMARY OF INVENTION

Individual glass fibres or strands are often formed into a bundle which serves as a light conduit. It is necessary, in forming such conduits and connecting them to various equipments, to seal the bundle at one or more points to a metal sleeve, disc or similar structure.

The individual glass fibres are assembled into a bundle and the bundle is disposed in a glass matrix. The matrix is peripherally coated with a glass frit and sealed to a metal member such as a flange.

We have succeeded in developing a new sealing alloy used as the metal member wherein the coefficients of thermal expansion of the fritted bundle and the alloy were sufficiently "matched" over a wide temperature range to avoid the creation both of tensile strains and excessive compressive strains and, at the same time, proper characteristics for sealing, such as forming a secure hermetic bond, were retained. This alloy basically comprises, by weight percent, 34.5%–35.5% nickel, 10.5%–11.5% cobalt, 1%–2% chromium and the balance iron. As will be explained in more detail below, we sometimes find it desirable to add up to 1% by weight of certain minor constituents such as silicon, manganese and carbon.

BRIEF DESCRIPTION OF THE DRAWINGS

The accompanying figure is a graph comparing the thermal expansion properties of our alloy with fritted glass fibre bundles over a selected temperature range.

DETAILED DESCRIPTION OF PREFERRED EMBODIMENT

Our alloy can have a typical composition as indicated in the table below:

| Element: | Percent by weight |
|---|---|
| Nickel | 35 |
| Cobalt | 11.0 |
| Chromium | 1.5 |
| Iron | 51.93 |
| Manganese | 0.35 |
| Silicon | 0.2 |
| Carbon | 0.02 |

The thermal expansion characteristics of this alloy over a temperature range of 25° C. to 460° C. (the temperature at which the seal is formed) are plotted as curve 10 in the accompanying figure. The corresponding thermal characteristics of the frit or glass solder are shown at curve 12 in this figure. It will be noted that curve 12 is extremely linear while curve 10 is not quite so linear. Nevertheless the mismatch between these two materials over the entire temperature range is extremely small. It will be seen that the contraction of the metal upon cooling is greater than that of the glass so that the glass is always maintained in compression. This is necessary because the seal cannot withstand tensile stresses. However, if under these circumstances, the characteristics are not so matched, as described above, the compressive strains become excessive.

The alloy can be produced by the same air or vacuum melting techniques used to produce the conventional nickel-iron sealing alloys.

Further experiments showed that the above composition could be varied somewhat within narrow limits as for example, 34.5%–35.5% nickel, 10.5%–11.5% cobalt, 1%–2% chromium and the balance iron, and the resultant seal would continue to display proper bonding, hermaticity and the like as well as retaining proper "matching" of the expansivity. Further, tensile strains were effectively eliminated, and compressive strains were minimized over the temperature range shown in the drawing. Indeed, our alloy remains as a stable single phase, not only in the range indicated but over a greater range, which extends from below −80° C. to the melting temperature of the alloy which is about 1500° C.

As in conventional sealing alloys, we have found that, while the minor constituents such as silicon, manganese and carbon can be eliminated without adverse effects in the seal itself, forgability and other metallurgical working properties of the alloy are enhanced when these constituents are used, providing that the total content by weight is about 1% or less.

While we described our invention with particular reference to a preferred embodiment, my protection is to be limited only by the claims which follow.

What is claimed is:
1. An alloy comprising, by weight percent:
34.5%–35.5% nickel;
10.5%–11.5% cobalt;
1%–2% chromium; and
the balance iron.
2. An alloy as set forth in claim 1 containing up to 1% of minor constituents such as silicon, manganese and carbon.
3. An alloy as set forth in claim 2 having an expansivity which is "matched" to that of solder glass over a temperature range of 25° C.–460° C.
4. An alloy as set forth in claim 2 which remains as a stable single phase over a temperature range from below −80° C. to 1500° C.
5. An alloy as set forth in claim 2 wherein the nickel content is 35%; cobalt content is 11.0%; chromium content is 1.5%; manganese content is 0.35%; silicon content is 0.2%; and carbon content is 0.02%.

References Cited

UNITED STATES PATENTS

| 2,000,024 | 5/1935 | McDonald | 75—128 |
| 2,000,026 | 5/1935 | McDonald | 75—128 |
| 2,668,944 | 2/1954 | Schwyn | 75—128 |
| 3,146,380 | 8/1964 | Clark | 75—171 |

HYLAND BIZOT, Primary Examiner

U.S. Cl. X.R.
75—171